(12) United States Patent
Lee

(10) Patent No.: US 8,456,034 B2
(45) Date of Patent: Jun. 4, 2013

(54) WIND POWER GENERATOR

(76) Inventor: Min Sung Lee, Pyeongtaek-Si (KR)

( * ) Notice: Subject to any disclaimer, the term of this patent is extended or adjusted under 35 U.S.C. 154(b) by 89 days.

(21) Appl. No.: 13/255,234

(22) PCT Filed: May 3, 2010

(86) PCT No.: PCT/KR2010/002785
§ 371 (c)(1),
(2), (4) Date: Sep. 7, 2011

(87) PCT Pub. No.: WO2010/107289
PCT Pub. Date: Sep. 23, 2010

(65) Prior Publication Data
US 2012/0001440 A1    Jan. 5, 2012

(30) Foreign Application Priority Data
Mar. 16, 2009  (KR) ......... 10-2009-0022061

(51) Int. Cl.
*F03D 3/06* (2006.01)
(52) U.S. Cl.
USPC ............................................................. 290/55
(58) Field of Classification Search
USPC ............................................ 384/206, 449, 49
See application file for complete search history.

(56) References Cited

U.S. PATENT DOCUMENTS 588,572 A * 8/1897 Hardaway, Robert E. ..... 415/4.2
4,204,796 A   5/1980 Pack, Jr.
6,298,570 B1 * 10/2001 Maughan et al. ............... 33/517
2008/0050237 A1 * 2/2008 Lee .......................... 416/197 A
2010/0109336 A1 * 5/2010 Lee ................................ 290/55

FOREIGN PATENT DOCUMENTS

| JP | 10-331758 | 12/1998 |
| JP | 2003-120520 | 4/2003 |
| KR | 10-2001-0073316 | 8/2001 |
| KR | 10-2001-0110425 | 12/2001 |
| KR | 10-0707132 | 4/2007 |

OTHER PUBLICATIONS

International Search Report for PCT/KR2010/002785 mailed Jan. 17, 2011.

* cited by examiner

*Primary Examiner* — Tulsidas C Patel
*Assistant Examiner* — Sean Gugger
(74) *Attorney, Agent, or Firm* — Christopher Paul Mitchell

(57) ABSTRACT

A wind power generator, which minimizes vortexes formed on a disc, thus efficiently rotating the disc, and which has blade type cells capable of increasing wind power, and which reduces friction load of a rotating shaft induced by the weight of the rotating shaft having blades, thus more efficiently rotating the rotating shaft, and which provides protection against a length of the rotating shaft varying according to weather conditions. The wind power generator includes a rotating shaft supported by upper and lower bearing units, a disc mounted on the rotating shaft and first, second and third wind collectors provided on upper and lower surfaces of the disc, with respective holes formed through the disc. The upper bearing unit includes an adjusting bolt having a first ball, a first bearing supporting the first ball and an adjusting nut. The lower bearing unit includes a second bearing and a second ball supported by the second bearing.

8 Claims, 3 Drawing Sheets

WIND POWER GENERATOR

RELATED APPLICATIONS

This application is a 371 application of International Application No. PCT/KR2010/002785, filed May 3, 2010, which in turn claims priority from Korean Patent Application No. 10-2009-0022061, filed Mar. 16, 2009, each of which is incorporated herein by reference in its entirety.

TECHNICAL FIELD

The present invention relates, in general, to a wind power generator provided by improving the structure of a rotor blade for a wind power generator disclosed in Korean Patent No. 0707132 granted to the inventor of the present invention and, more particularly, to a wind power generator, which minimizes formation of vortexes on the rotor blade of No. 0707132, increases the wind power, reduces friction load of a rotating shaft induced by the weight of the vertically installed rotating shaft, and provides protection against the length of the rotating shaft varying depending on weather conditions, thus efficiently rotating the rotor blade and efficiently generating electric power.

BACKGROUND ART

An example of conventional wind power generators is a rotor blade for a wind power generator disclosed in Korean Patent No. 0707132. Korean Patent No. 0707132 is intended to provide a rotor blade for a wind power generator, in which a plurality of air guide holes are formed through a disc and a plurality of air pockets are formed in areas having the air guide holes, thus protecting the rotor blade from strong and irregular wind blowing on the upper and lower surfaces of the disc in diagonal directions and guiding the wind blowing on the upper and lower surfaces of the disc, thereby efficiently accelerating both the rotation of the rotor blade and the rotation of the rotating shaft. Further, Korean Patent No. 0707132 is intended to provide a rotor blade for a wind power generator, in which a propeller shaft is provided at one end of a rotating shaft and is assembled with a universal coupling having flange couplings, so that the propeller shaft can be indirectly coupled to a gear box or to a power generator using another universal coupling, thus being easy to repair and being able to be selectively used with various power generators having different power generating capacities.

In order to accomplish the above-mentioned objects, Korean Patent No. 0707132 provides a rotor blade for a wind power generator, comprising: a rotating shaft having a first flange coupling in a first end thereof and rotatably supported by at least one bearing installed in a support frame; a disc mounted to the rotating shaft; a plurality of air guides formed through the disc and guiding wind blowing on upper and lower surfaces of the disc; a plurality of first wind collectors formed around upper and lower ends of the air guides, thus collecting wind blowing on the upper and lower surfaces of the disc and rotating the rotating shaft; a plurality of second wind collectors mounted both to the rotating shaft and to the disc, thus collecting wind blowing on the disc and rotating the rotating shaft; a first universal coupling having a second flange coupling in a first end thereof and coupled to the first flange coupling of the rotating shaft, with at least one vertical protrusion vertically formed on an inner surface of a mounting hole formed in a second end of the first universal coupling; and a propeller shaft having at least one vertical hole, which is formed in a first end of the propeller shaft and is inserted into the mounting hole such that the vertical hole can be fitted over the vertical protrusion and can be moved in a vertical direction, with both a third flange coupling and a second universal coupling provided in a second end of the propeller shaft.

In an embodiment disclosed in Korean Patent No. 0707132, the air guides are holes formed through the disc in an outer circumferential area of the disc, and these holes are spaced apart from each other at regular intervals. The first wind collectors are air pockets formed on predetermined areas on the upper and lower surfaces of the disc having the air guides such that the air pockets are opposed to each other and collect wind. Further, the second wind collectors are blades, which are formed on the upper and lower surfaces of the disc such that the blades extend in radial directions and are opposed to each other, and are securely mounted to the rotating shaft. The blades constituting the second wind collectors are curved and are concaved to a predetermined depth in locations close to one ends of the air pockets formed on the upper and lower surfaces of the disc.

The blades are mounted to inclined frames which extend from the rotating shaft and are attached to the upper and lower surfaces of the disc. One end of each air guide hole extends outwards such that the end of the air guide hole is exposed to the outside by a predetermined length compared to an open end of each air pocket. Further, the air pockets are configured such that the width and height of each air pocket is gradually reduced in a direction from the first to the second end of the air pocket and the air pocket has a tapering shape which has also both a semicircular appearance and a hollow structure.

According to tests of the rotor blade for the wind power generator of No. 0707132, the rotor blade can be protected from strong and irregular wind blowing on the upper and lower surfaces of the disc in diagonal directions and the wind blowing on the upper and lower surfaces of the disc can be efficiently guided, thereby easily accelerating both the rotation of the rotor blade and the rotation of the rotating shaft. However, the rotor blade for the wind power generator of No. 0707132 is problematic in that, when wind flows outwards while coming into contact with the inner surfaces of the blades constituting the second wind collectors, vortexes are formed in the wind at locations around the air pockets, thus disturbing a uniform rotation of the rotor blade.

Further, the wind power generator of No. 0707132 is advantageous in that it is easy to repair both the propeller shaft and the coupling structure between the propeller shaft and the gear box or the power generator indirectly coupled to the propeller shaft using the second universal coupling and the rotor blade can be selectively used with various power generators having different power generating capacities. However, the rotor blade is problematic in that the propeller shaft is vertically installed and cannot be smoothly rotated due to the weight thereof. Particularly, the rotor blade has no device for responding to changes in the length of the propeller shaft which occur in accordance with weather conditions, so that the rotating shaft cannot be smoothly rotated. Therefore, it is desired to provide a wind power generator, which can prevent the generation of vortexes in the wind on the rotor blade and can efficiently control the changes in the length of the rotating shaft due to either the weight of the rotating shaft or weather conditions.

DISCLOSURE OF INVENTION

Technical Problem

Accordingly, the present invention has been made keeping in mind the above problems occurring in the related art, and is intended to provide a wind power generator, which is provided by improving the construction of the rotor blade for the wind power generator disclosed in Korean Patent No. 0707132 and minimizes generation of vortexes in the rotor blade, thus realizing an efficient rotation of the rotor blade, and has blade type cells capable of increasing wind power, and reduces friction load of a rotating shaft induced by the weight of the vertically installed rotating shaft having blades, thus allowing the rotating shaft to more efficiently rotate, and provides protection against the length of the rotating shaft varying according to weather conditions.

Solution to Problem

In an aspect, the present invention provides a wind power generator, comprising: a rotating shaft rotatably supported by upper and lower bearing units installed on a support frame; a disc mounted on the rotating shaft; a plurality of first wind collectors provided on upper and lower surfaces of the disc and having holes formed through the disc, thus collecting wind blowing on the upper and lower surfaces of the disc and rotating the rotating shaft; and a plurality of second wind collectors installed on inclined frames mounted both to the rotating shaft and to the upper and lower surfaces of the disc, thus collecting wind blowing on the disc and rotating the rotating shaft, wherein the upper bearing unit comprises: an adjusting bolt having a first ball at a lower end thereof; a first bearing without an inner race, the first bearing supporting a lower surface of the first ball while realizing point contact rolling of the first ball; and an adjusting nut tightened to an upper end of the adjusting bolt at a location on an upper surface of the support frame, wherein an upper end of the rotating shaft is coupled to a first spline mounted to a lower end of a first bearing seat; the lower bearing unit comprises: a second bearing without an inner race; a second ball supported by the second bearing while realizing point contact rolling relative to the second bearing; and a second spline mounted to an upper end of the second ball, wherein a lower end the rotating shaft is coupled to the second spline; and a rotation transmitting element is provided in a lower portion of the rotating shaft and transmitting a rotating force of the rotating shaft to a power generating device.

In an embodiment, the wind power generator may further comprise a plurality of third wind collectors provided between the first and second wind collectors arranged on the upper and lower surface of the disc in radial directions.

In an embodiment, the wind power generator may further comprise a plurality of additional holes formed through the disc such that the additional holes are open in second and third wind collectors.

In an embodiment, each of the second and third wind collectors may be provided with at least one blade type cell formed in a vertical direction in parallel to the rotating shaft.

In an embodiment, the first ball mounted to the lower end of the adjusting bolt, the first bearing which is in point-contact with the lower surface of the first ball, and the first bearing seat may be provided in a first oil casing, and the second bearing and the second ball which is in point-contact with the second bearing may be provided in a second oil casing.

In an embodiment, the wind power generator may further comprise a guide tube provided on the second oil casing and guiding a rotation of the rotating shaft, and a cap provided in the lower portion of the rotating shaft at a location above the guide tube, with a sealant sealing a gap between the cap and the rotating shaft.

ADVANTAGEOUS EFFECTS OF INVENTION

As described above, in the wind power generator according to the present invention, at least one blade type cell is formed in each of first through third wind collectors, thus minimizing the generation of vortexes typically formed in a conventional rotor blade, and the angles of inclination of the blade type cells are set at 100°~150°, thus increasing wind power, and upper and lower bearing units are installed in upper and lower ends of the rotating shaft, thus realizing point contact rolling of the rotating shaft and supporting the rotation of the rotating shaft, thereby allowing the rotating shaft to efficiently rotate, and the length variation of the rotating shaft according to weather conditions can be easily controlled using both an adjusting bolt and an adjusting nut, thus realizing efficient rotation of the rotating shaft and efficient generation of electric energy.

MODE FOR THE INVENTION

Hereinbelow, a preferred embodiment of the present invention will be described in detail with reference to the accompanying drawings.

Figure 1:
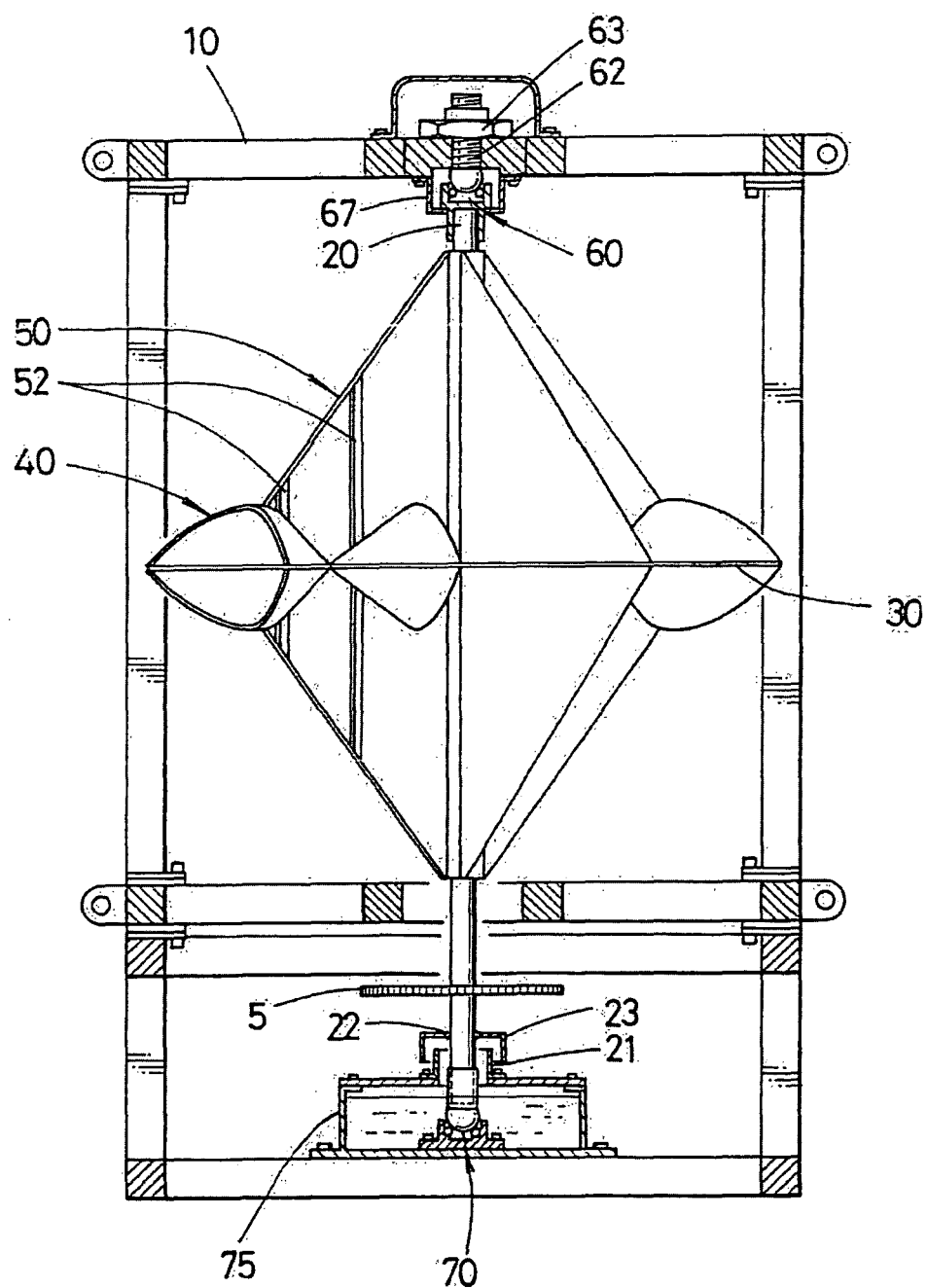
FIG. 1 is a sectional view illustrating the construction of a wind power generator according to an embodiment of the present invention.
Figure 2:
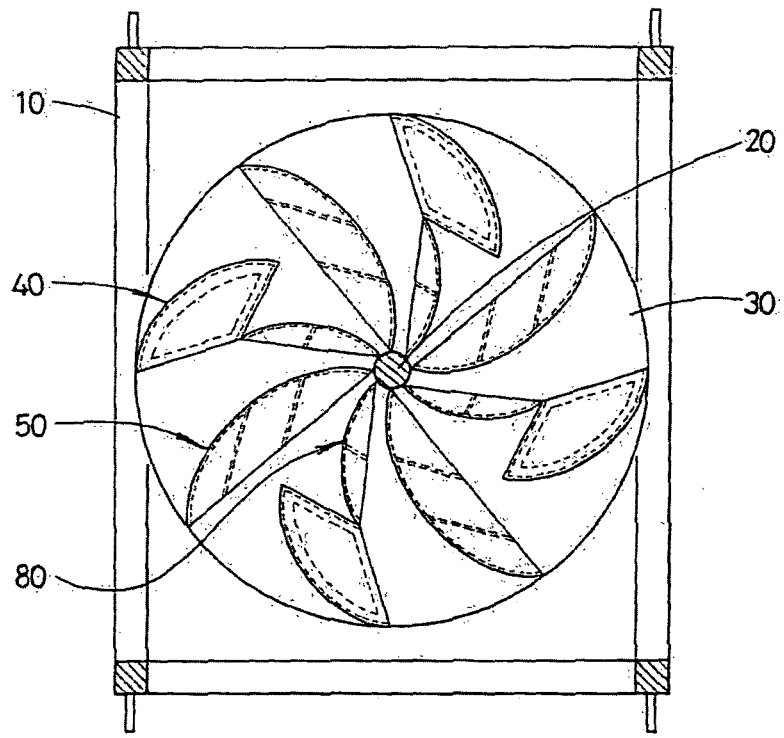
FIG. 2 is a plane view of the wind power generator shown in FIG. 1.
Figure 3:
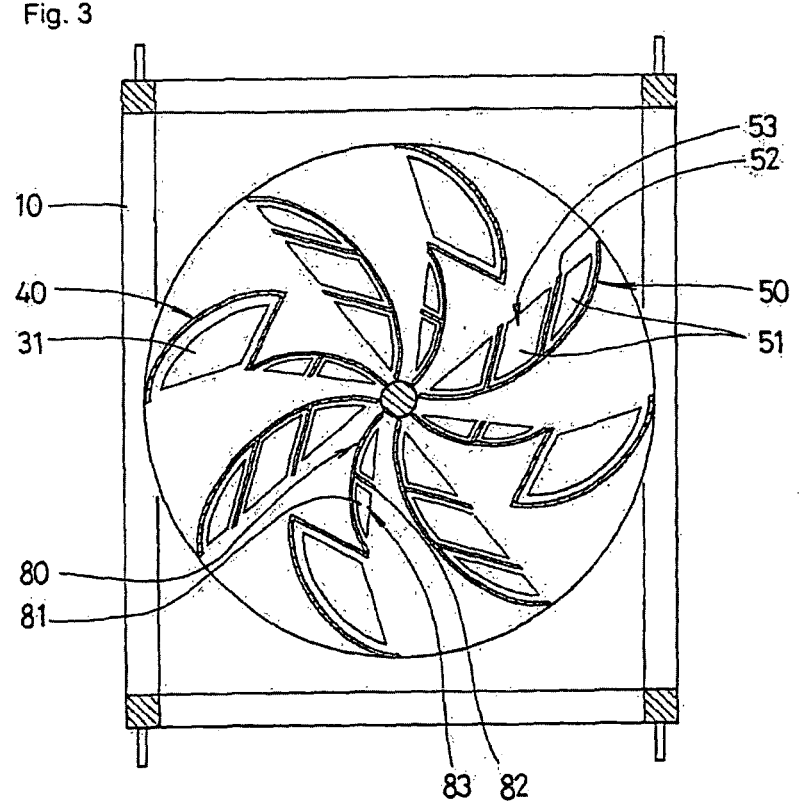
FIG. 3 is a plane sectional view of the wind power generator shown in FIG. 2.
Figure 4:
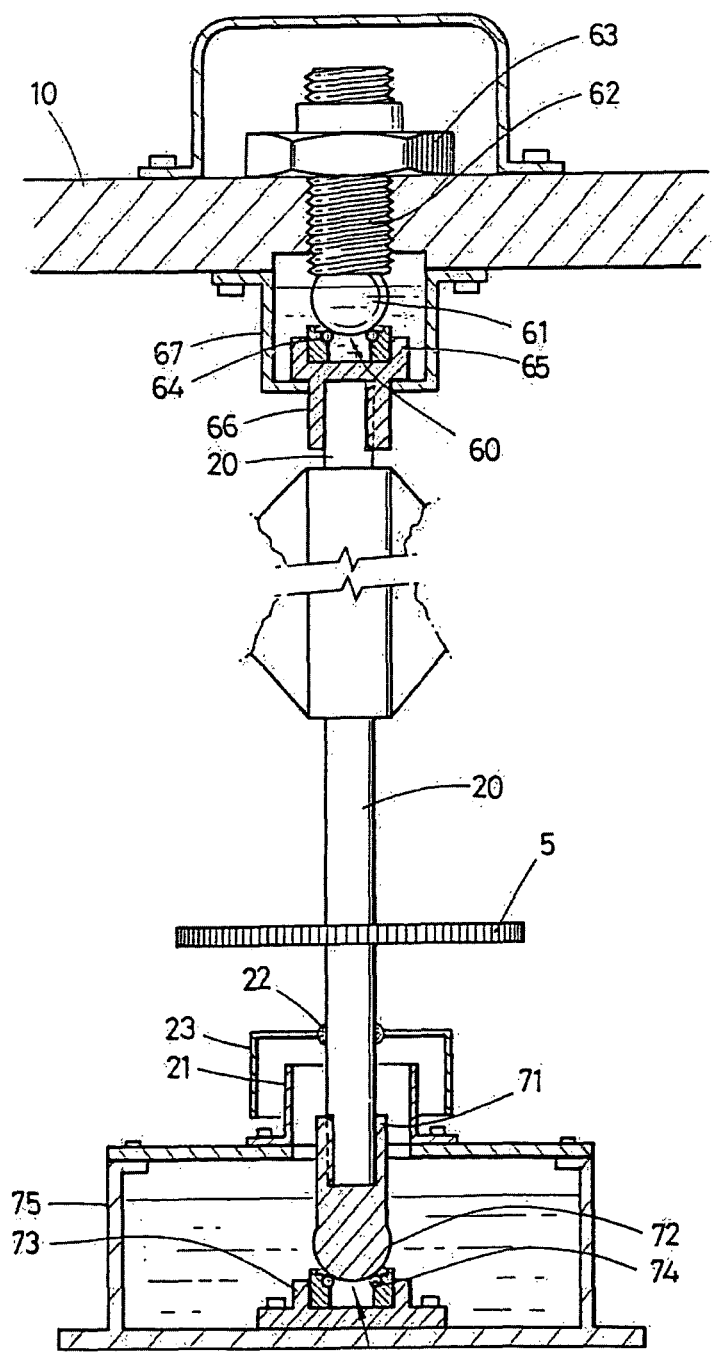
FIG. 4 is an enlarged sectional view illustrating the internal construction of a rotating shaft included in the wind power generator according to the present invention, from which the blades have been removed.

FIG. 1 is a sectional view illustrating the construction of a wind power generator according to an embodiment of the present invention. FIG. 2 is a plane view of the wind power generator shown in FIG. 1. FIG. 3 is a plane sectional view of the wind power generator shown in FIG. 2. FIG. 4 is an enlarged sectional view illustrating the internal construction of a rotating shaft included in the wind power generator according to the present invention, from which the blades have been removed.

The wind power generator according to the present invention comprises a support frame 10, a rotating shaft 20, a disc 30 installed on the rotating shaft 20, and a plurality of first and second wind collectors 40 and 50 provided on upper and lower surfaces of the disc 30 and spaced apart from each other at regular intervals. Provided in a lower portion of the rotating shaft 20 is a rotation transmitting element 5, which is connected to either a gear box or a power generating device (not shown) and transmits the rotating force of the rotating shaft 20 to the gear box or to the power generating device.

The upper end of the rotating shaft 20 according to the present invention is coupled to a first spline 66 of an upper bearing unit 60 such that the upper end of the rotating shaft 20 can rotate. The lower end of the rotating shaft 20 is coupled to a second spline 71 of a lower bearing unit 70 such that the lower end of the rotating shaft 20 can rotate.

In the upper end of the rotating shaft 20 coupled to the upper bearing unit 60 according to the present invention, an adjusting bolt 62 having a first ball 61 is mounted to an upper part of the support frame 10 through a screw type engagement, with an adjusting nut 63 tightened to the upper end of adjusting bolt 62. Further, a first bearing 64 without an inner race is installed just below the lower surface of the first ball 61, thus realizing point contact rolling of the first ball 61 relative to the first bearing 64. The first bearing 64 is seated in a first bearing seat 65, which has the first spline 66. The upper end of the rotating shaft 20 is coupled to the first spline 66, so that, when it is required to control the length of the rotating shaft 20 which has been changed by weather conditions, a worker tightens or loosens the adjusting nut 63 and moves the adjusting bolt 62 upwards or downwards, thus bringing the first ball 61 into appropriate frictional contact with the first bearing 64. The first ball 61, the first bearing 64 and the first bearing seat 65 are installed in a first oil casing 67 filled with lubrication oil, thus realizing smooth rolling of the first ball 61 relative to the first bearing 64.

In the present invention, the lower end of the rotating shaft 20 rotatably supported by the lower bearing unit 70 is coupled to a second spline 71. A second ball 72 is provided in the lower end of the second spline 71. The second ball 72 is rotatably supported by a second bearing 74 without an inner race seated in a second bearing seat 73, thus realizing point contact rolling of the second ball 72 relative to the second bearing 74. Further, the second bearing seat 73, the second bearing 74 and the second ball 72 are installed in a second oil casing 75 filled with lubrication oil, thus realizing smooth rolling of the second ball 72 relative to the second bearing 74. Here, a guide tube 21 for guiding the rotation of the rotating shaft 20 is installed on the second oil casing 75. In the lower portion of the rotating shaft 20, a cap 23 is fitted over the rotating shaft 20 at a location above the guide tube 21. Here, the gap between the cap 23 and the rotating shaft 20 is sealed with a sealant 22.

The disc 30 is mounted on the rotating shaft 20. The upper and lower surfaces of the disc 30 have holes 31, which are formed through the disc 30. The holes 31 are provided with first wind collectors 40 for collecting the wind blowing on the upper and lower surfaces of the disc 30, thus rotating the rotating shaft 20. The upper and lower surfaces of the disc 30 are further provided with second wind collectors 50 for collecting the wind blowing on the upper and lower surfaces of the disc 30, thus rotating the rotating shaft 20. Third wind collectors 80 are provided between the first and second wind collectors 40 and 50. Holes 51 and 81 are formed through the disc 30 such that the holes 51 and 81 in respective second and third wind collectors 50 and 80 are open.

In the present invention, at least one blade type cell 53, 83 is formed in each of the second and third wind collectors 50 and 80 such that the blade type cell 53, 83 extends vertically in parallel to the rotating shaft 20 and the angles of the blade type cells 53 and 83 are set at 100°~150°. Therefore, unlike the conventional wind power generator in which the wind collides on the rotating shaft and forms vortexes when wind flows outwards when contact is made with the second wind collectors, the present invention temporarily captures the wind in the blade type cells 53 and 83, thus preventing the formation of vortexes and increasing the wind power.

As described above, unlike the rotor blade for the wind power generator disclosed in Korean Patent No. 0707132, third wind collectors 80 in addition to first and second wind collectors 40 and 50 are provided in the wind power generator of the present invention, and holes 31, 51 and 81 are formed in respective first, second and third wind collectors 40, 50 and 80, thus reducing loss of wind blowing on the upper and lower surfaces of the disc 30. Further, in the present invention, at least one blade type cell 53, 83 is formed in each of the second and third wind collectors 50 and 80, thus minimizing formation of vortexes which may be easily formed by conventional second wind collectors. Further, the upper and lower ends of a rotating shaft 20 are provided with upper and lower bearing units 60 and 70, thus realizing point contact rolling of the rotating shaft relative to the bearing units and allowing smooth rotation of the rotating shaft 20. Further, the wind power generator of the present invention easily controls the change in the length of the rotating shaft 20 according to weather conditions using both an adjusting nut 63 and an adjusting bolt 62, thus realizing smooth rotation of the rotating shaft.

Although the embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A wind power generator, comprising:
a rotating shaft rotatably supported by upper and lower bearing units installed on a support frame; a disc mounted on the rotating shaft;
a plurality of first wind collectors provided on upper and lower surfaces of the disc and having holes formed through the disc, thus collecting wind blowing on the upper and lower surfaces of the disc and rotating the rotating shaft; and
a plurality of second wind collectors installed on inclined frames mounted both to the rotating shaft and to the upper and lower surfaces of the disc, thus collecting wind blowing on the disc and rotating the rotating shaft,
wherein,
the upper bearing unit comprises:
an adjusting bolt having a first ball at a lower end thereof;
a first bearing without an inner race, the first bearing supporting a lower surface of the first ball while realizing point contact rolling of the first ball; and
an adjusting nut tightened to an upper end of the adjusting bolt at a location on an upper surface of the support frame, wherein an upper end of the rotating shaft is coupled to a first spline mounted to a lower end of a first bearing seat;
the lower bearing unit comprises:
a second bearing without an inner race;
a second ball supported by the second bearing while realizing point contact rolling relative to the second bearing; and a second spline mounted to an upper end of the second ball, wherein a lower end the rotating shaft is coupled to the second spline; and
a rotation transmitting element is provided in a lower portion of the rotating shaft and transmitting a rotating force of the rotating shaft to a power generating device.

2. The wind power generator as set forth in claim 1, further comprising: a plurality of third wind collectors provided between the first and second wind collectors arranged on the upper and lower surface of the disc in radial directions.

3. The wind power generator as set forth in claim 1, further comprising: a plurality of additional holes formed through the disc such that the additional holes are open in second and third wind collectors.

4. The wind power generator as set forth in claim 1, wherein each of the second and third wind collectors is provided with at least one blade type cell formed in a vertical direction in parallel to the rotating shaft.

5. The wind power generator as set forth in claim 1, wherein the first ball mounted to the lower end of the adjusting bolt, the first bearing which is in point-contact with the lower surface of the first ball, and the first bearing seat are provided in a first oil casing; and the second bearing and the second ball which is in point-contact with the second bearing are provided in a second oil casing.

6. The wind power generator as set forth in claim 1, further comprising: a guide tube provided on the second oil casing and guiding a rotation of the rotating shaft; and a cap provided in the lower portion of the rotating shaft at a location above the guide tube, with a sealant sealing a gap between the cap and the rotating shaft.

7. The wind power generator as set forth in claim 2, further comprising: a plurality of additional holes formed through the disc such that the additional holes are open in second and third wind collectors.

8. The wind power generator as set forth in claim 2, wherein each of the second and third wind collectors is provided with at least one blade type cell formed in a vertical direction in parallel to the rotating shaft.

* * * * *